J. & C. J. BAMFORD.
SWATH TURNER OR HAY COLLECTOR.
APPLICATION FILED AUG. 27, 1910.
1,047,147.
Patented Dec. 17, 1912.
3 SHEETS—SHEET 3.
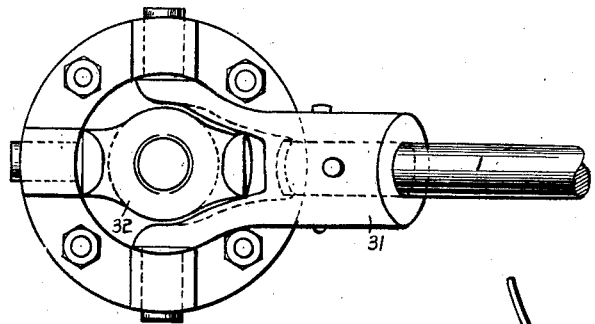
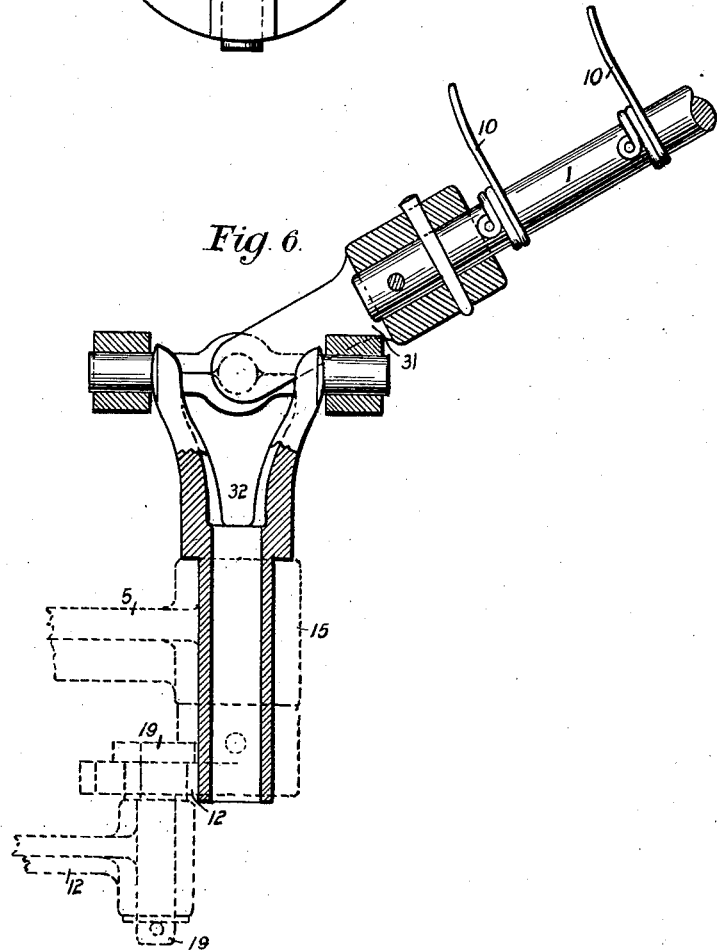
Witnesses.
John C. Sanders
Leon Spring
Inventors:
Joseph Bamford
Cyril Joseph Bamford
BY Wm. Wallace White
ATT'Y.

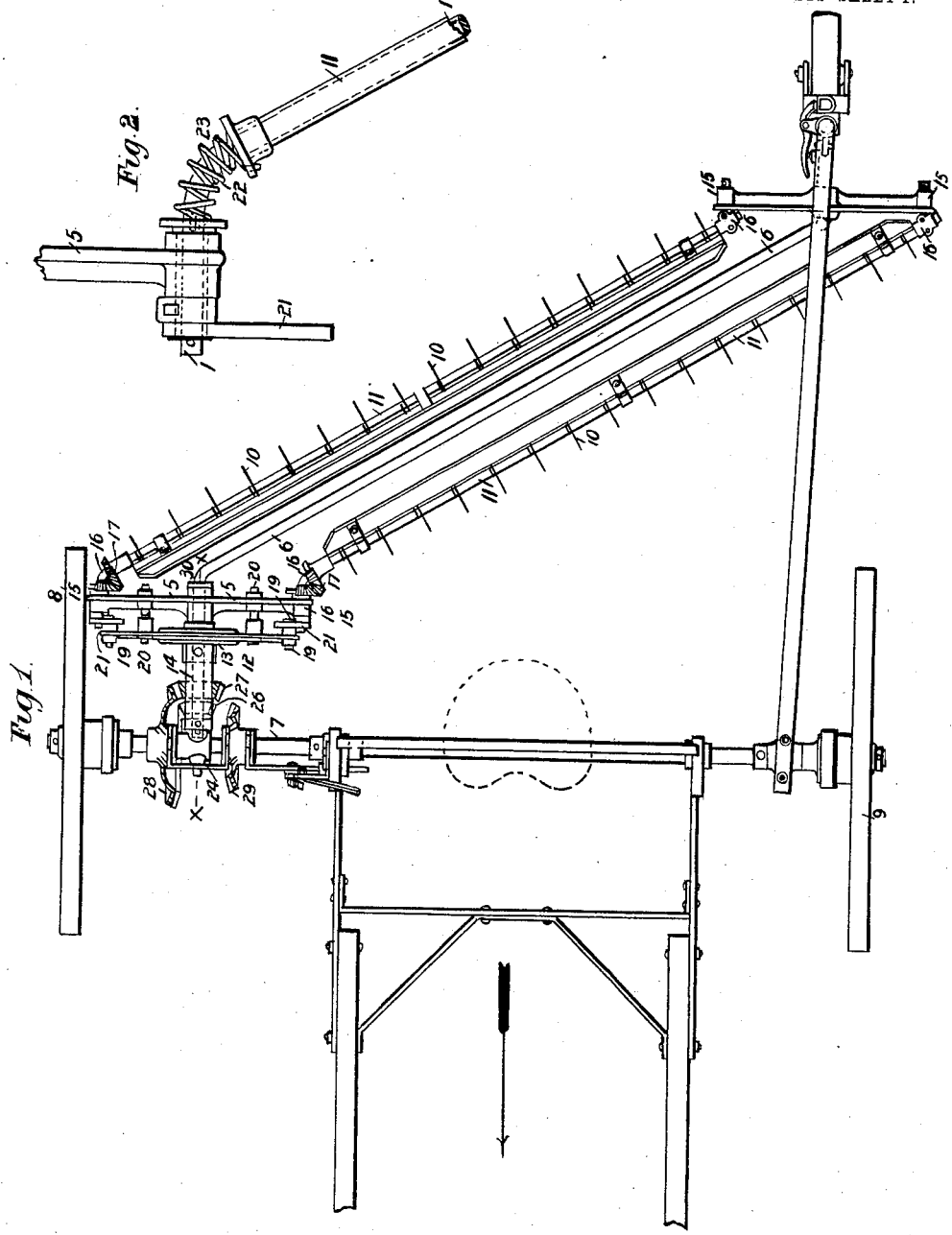

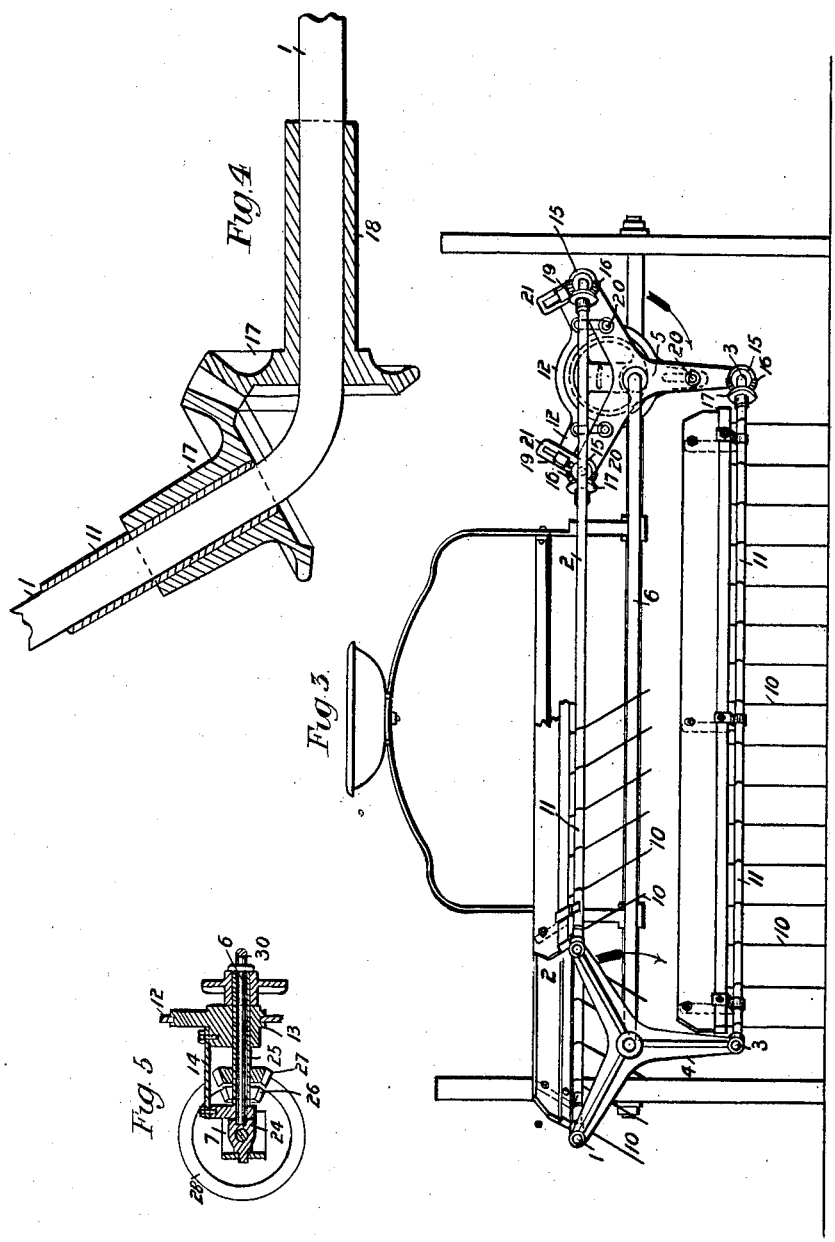

UNITED STATES PATENT OFFICE.

JOSEPH BAMFORD AND CYRIL JOSEPH BAMFORD, OF UTTOXETER, ENGLAND.

SWATH-TURNER OR HAY-COLLECTOR.

1,047,147.  Specification of Letters Patent.  Patented Dec. 17, 1912.

Application filed August 27, 1910. Serial No. 579,335.

*To all whom it may concern:*

Be it known that we, JOSEPH BAMFORD and CYRIL JOSEPH BAMFORD, subjects of His Majesty the King of Great Britain and Ireland, residing at St. Mary's Mount, Uttoxeter, in the county of Stafford, England, have invented new and useful Improvements in Swath-Turners or Hay-Collectors, of which the following is a specification.

This invention has reference to swath turners or hay collectors of that type in which the tines are carried on driving link bars inclined to the road axle and having bent ends and adapted to revolve in bearings carried by two or more rotatable members or the like which are mounted to revolve on a non-rotating bent axle or are otherwise arranged eccentrically relatively to each other in parallel planes both or all of the rotatable members revolving at the same speed and thus imparting the proper combined rotating and endwise movements to the driving link bars and tines to turn or gather the hay.

The object of this invention is to so construct and arrange the tines on the driving link bars and the means for operating the tines in swath turners or hay collectors of the aforementioned type that they will have a turning or swinging movement independently of the driving link bars, and the tines as they move down and approach the ground will have their pointed ends inclined outwardly from the center line of the machine at one side thereof and then as the tines move along or just above the ground they will turn on the driving link bars and be inclined to the other side of the machine as they rise out of the crop, thus the sweep or traverse of the tines during the effective portion of their circular travel will be considerably greater and more effective than is the case in machines of this class in which the tines have no positive and independent movement on the driving link bars.

Pendent tines on bars combined with mechanism by which they have had swinging or turning movements as aforesaid, have previously been used on swath turners and hay collectors of that kind in which the tine reel with the bars and pendent tines rotate, but the bars and tines have no endwise movements. In such machines the mechanism employed for imparting the turning or swinging movements to the tines is not adapted for imparting the said swinging and turning movements to those tines which, as in the type of machine to which this invention relates, are mounted on link bars which with the tines have endwise movements in addition to their rotary movements.

On the accompanying drawings Figure 1, is a plan of a swath turner or hay collector of the type herein referred to constructed in accordance with this invention; Fig. 2 is a plan of a portion of the same illustrating a modification of the means for operating the tines; Fig. 3 is a back elevation of the said machine; Fig. 4 is a sectional plan of a part of the mechanism shown in Figs. 1 and 3 for operating the tines, but shown on a larger scale than are those figures; Fig. 5 is a part sectional elevation through Fig. 1 taken on line X X; Fig. 6 is a horizontal section through a suitable form of coupling arrangement, showing the tines fixed directly on the driving link bars; and Fig. 7 is an elevation of the coupling arrangement shown in Fig. 6.

In the particular machine illustrated by our drawings there are three sets of tines carried on the three driving link bars, 1, 2, and 3, the ends of which are bent and mounted and adapted to turn in bearings carried by the two members 4, 5, which are mounted and adapted to revolve on the bent axle 6 in the usual way, so as to impart the proper movements to the tines to gather the hay. The member 5 has rotary motion imparted to it on the axle 6 in the usual way from the main axle 7 of the two road wheels 8 and 9 through the usual bevel reversing gear; which allows of the tines working with either a forward movement as a side delivery rake or backward for turning over the swaths or as a tedder or the gearing may be made so as to reverse the direction of rotation of the tines.

We will now describe how our invention is applied to this well-known type of machine.

In carrying out this invention the tines 10 are so mounted on the driving link bars 1, 2, and 3, as to turn or oscillate thereon or therewith in the manner hereinafter described, preferably by the tines being fixed on tubular sleeves 11 which are mounted on and turn on the driving link bars 1, 2, and 3. Or the link driving bars may be made with a universal joint instead of the bend as will readily be understood. The necessary turning or oscillating movements are imparted to these tubular sleeves 11 by any convenient means so that as the members 4, 5, revolve in the direction indicated by the arrows in Fig. 3, the tines 10 in their downward movement project outwardly in a downward inclined direction as do the tines 10 on the driving link bar 2 on the right hand side of Fig. 3, and this inclination becomes less as the tines 10 approach their lowest position on the vertical center line, where they are vertical or nearly so as are the tines 10 on the driving link bar 3 in Fig. 3, and then the tines 10 become gradually more and more inclined outwardly at the other side of the machine that is, the left hand side in Fig. 3 as they rise from the ground as the tines 10 on the driving link bar 1 in Fig. 3, the maximum inclination being when they are at about the extremity of the horizontal diameter, after which their inclination becomes gradually less until, as they cross the vertical center line above the axis 6 they are vertical, or nearly so, and then they gradually commence to incline outwardly in the opposite direction, that is, toward the right hand in Fig. 3, as they move toward the ground as aforesaid. Thus the acting portions of the tines 10 have a much longer arc of effective movement than is the case in the type of machine as hitherto constructed.

Any convenient arrangement of mechanism may be employed for imparting the said turning movements to the tines 10 on or with the driving link bars 1, 2, and 3 but the mechanism which we prefer to employ, however, is that illustrated in Figs. 1, 3, and 4, and is arranged as follows:—

We provide a third member 12 of smaller diameter than are the two members 4, 5, which carry the driving link bars 1, 2, and 3 and this third member 12 is preferably arranged parallel with the other two members 4, 5, which carry the driving link bars 1, 2, and 3 and eccentric therewith which can readily be done by mounting the third member 12 to revolve like an eccentric strap around a stationary eccentric 13. The stationary eccentric 13 the center of which is arranged at a higher level than the bent axle 6 but on the same vertical center line, is mounted upon the end of a bracket 14 which bracket is connected to the bearing bracket 24 on the main axle 7 of the road wheel and overhangs the sleeve 25 carrying the bevel pinions 26, 27, which gear with one or other of the usual bevel wheels 28, 29, which are adapted to slide on a feather, on the axle of the road wheels, while the sleeve 25, which rotates on the bent ends 30 of the axle 6 revolves within the eccentric 13 and is arranged to rotate the member 5 which is fixed on the sleeve. The tines 10 are mounted on tubular sleeves 11 which extend along practically the whole length of the straight parts of the driving link bars 1, 2, and 3, except where such driving link bars are carried by the bearings 15 of the bent ends 16 in the members 4 and 5. One end of each tubular sleeve is geared through toothed quadrants or bevel wheels or the like 17 with bushing 18 mounted on the straight ends of the driving link bars 1, 2, and 3, in bearings in the members 4 and 5. Each of these bushings has a crank 21 fixed on it, and these cranks 21 are slotted so as to engage and slide on three pins 19 which are fixed on the third member 12. Or the crank may be made in the form of a plunger and made to slide to and fro on a swivel eye on the small member 12. This third member 12 is driven from the disk or the like 5 by three or other suitable number of cranks 20 which engage in holes or bearings in the arms of the member 5 and in the member 12 and thus positively drive the latter from the former. Or other suitable means may be employed for driving the member 12 from the member 5. Thus all three members 4, 5, and 12, revolve together and at the same speed, and it follows that as they revolve, the cranks 21, which are geared to the sleeves 11 and engage with the pins 19 of the third or small eccentric member 12, impart angular turning movements to the sleeves 11 on the driving link bars 1, 2, and 3 and the tines 10 which are fixed on said sleeves are turned outwardly or are made to oscillate on the driving link bars in the manner and for the purpose above described.

It will be evident that any suitable means other than the toothed quadrants 17, 17, may be adopted for imparting the necessary turning movements to the sleeves 11 on the bars 1, 2, and 3, from the cranks 21, for instance each of the bushings 18 of the cranks may be connected to the corresponding sleeve 11 by means of a universal joint or flexible coupling such as a pair of right and left hand coiled springs 22, 23, as in Fig. 2, the ends of both of these springs being fixed respectively to the ends of the bushing and to the sleeves 11 so as to impart the turning or oscillating movements of the former to the latter. In these arrangements the tubular sleeves are dispensed with and the tines 10 are mounted directly upon the driving link bars 1, the required oscillating or turning movement of the tines will then be transmitted directly to the driving link bars 1 through the medium of any suitable form of universal joint, or flexible coupling such as 31 and 32. The one end of each of the driving link bars 1 is mounted in the part 31 of the coupling which is connected to the other part 32 of the coupling, and the rear of the parts 32 of the couplings are arranged in the bearings 15 in a similar manner to the bushes 18 illustrated with regard to Figs. 1 to 4, the other end of the driving link bars being free to turn in the bearing connections at their ends.

For the purpose of allowing the tines to be so fixed or adjusted on the sleeves or the driving link bars as to turn or swing more to one side of the machine than the other, each of the tines may be fixed on to the sleeve or driving link bars by a set screw so that their inclination to the vertical may be altered by moving the set screws.

What we claim as our invention and desire to secure by Letters Patent is:—

1. In a swath turner or hay collector, in combination, a main axle, rotatable members, said members being positioned in planes parallel to one another, means for driving said members at the same speed from said axle, driving link bars inclined to said axle and having bent ends journaled in said members, tines carried by said bars, and means operatively connected to said axle and to said tines for imparting positive forward and backward swinging movement to said tines as they are carried around with said driving link bars.

2. In a swath turner or hay collector, in combination, a main axle, rotatable members, said members being positioned in planes parallel to one another, means for driving said members at the same speed from said axle, driving link bars inclined to said axle and having bent ends journaled in said members, tines carried by said bars, and means comprising an eccentric device operatively connected to said axle and to said tines for imparting positive forward and backward swinging movement to said tines as they are carried around with said driving link bars.

In testimony whereof we have signed our names to this specification in the presence of two subscribing witnesses.

JOSEPH BAMFORD.
CYRIL JOSEPH BAMFORD.

Witnesses:
CHARLES BOSWORTH KELLEY,
WALKER BARTLAM.

Copies of this patent may be obtained for five cents each, by addressing the "Commissioner of Patents, Washington, D. C."